UNITED STATES PATENT OFFICE.

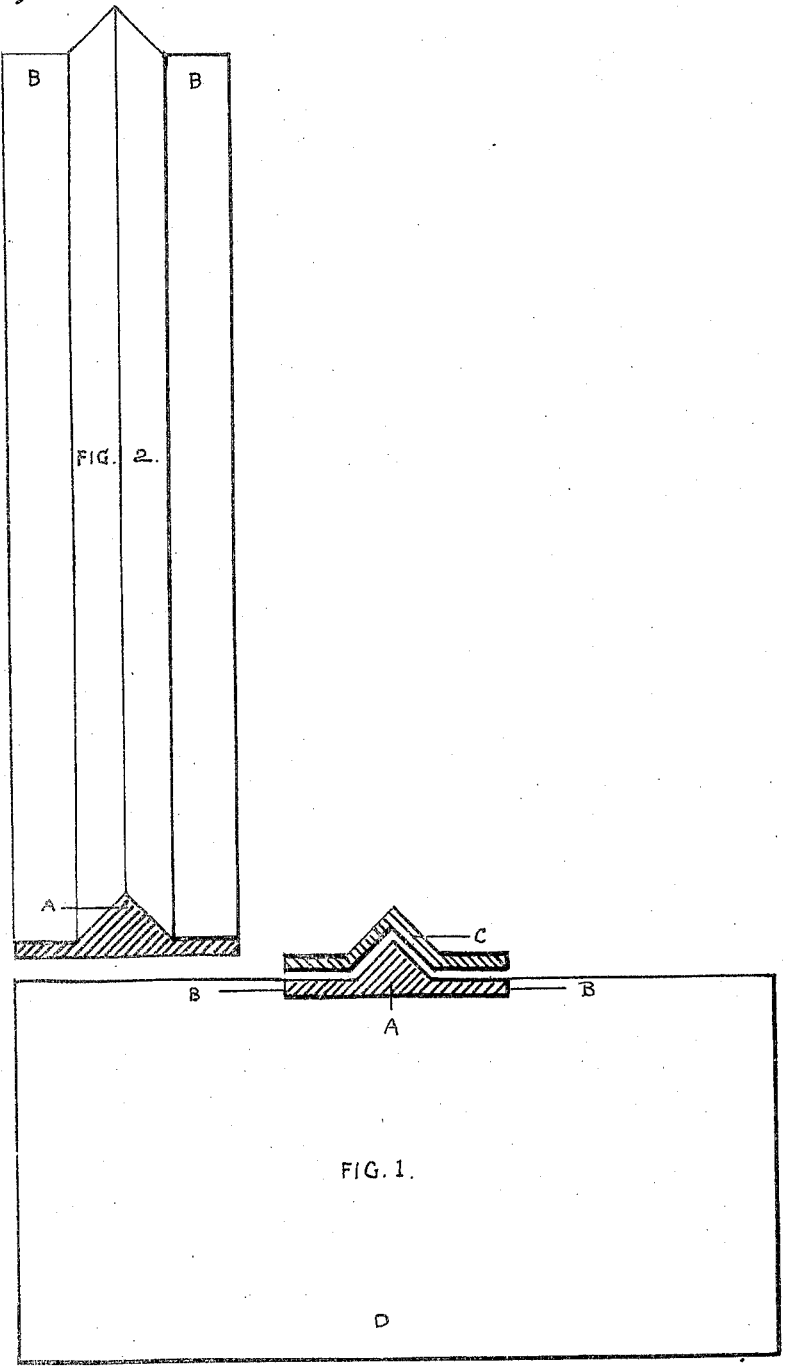

HERBERT L. STILLMAN, OF WESTERLY, RHODE ISLAND.

JOINT-SUPPORT FOR LIGHT RAILWAYS.

1,341,446.  Specification of Letters Patent.   Patented May 25, 1920.

Application filed July 15, 1919. Serial No. 311,047.

*To all whom it may concern:*

Be it known that I, HERBERT L. STILLMAN, a citizen of the United States, residing in Westerly, in the county of Washington and State of Rhode Island, have invented a new and useful Joint-Support for Light Railways, the same being an improvement on the joint-support in my United States Patent No. 1,099,948, issued June 16, 1914.

My invention relates more particularly to light auto service where very light metal joint supports are used. The invention will be fully understood from the following description when taken in connection with the accompanying drawings in which:—

Figure 1 indicates a cross section of one of my joint supports in connection with a rail and a supporting wooden stringer.

Fig. 2 indicates a plan view of the metal joint support removed.

Referring by letter to said drawings:—

A indicates the body of a joint support.

B B indicate side wings.

C indicates a rail.

D indicates a wooden stringer.

The principal advantages of this light joint support are in the increase of metal depth in its base with its side wings giving great strength and firmness to the said joint and also in the said side wings by rendering a much greater bearing on the wood surface, thereby preventing cutting into the wooden stringer by continual wear.

It will also be seen that my angle rail instead of having a projecting shoulder like rails for flanged wheels which prevent turning on or off of them, has a bevel on each side at an angle of about 45 degrees fitting a grooved metal treaded wheel (see above patent referred to).

The said joint support is secured in position by being gained into the stringer and by the terminal rail fastenings.

Having described this invention, what I claim and desire to secure by Letters Patent is;

The improved rail joint support herein described, having a triangular shaped body with laterally extending side wings combined with an angular topped rail with lateral side wings as specified.

HERBERT L. STILLMAN.

Witnesses:
  S. BENEDICT,
  EUGENE B. PENDLETON